Figure 1:
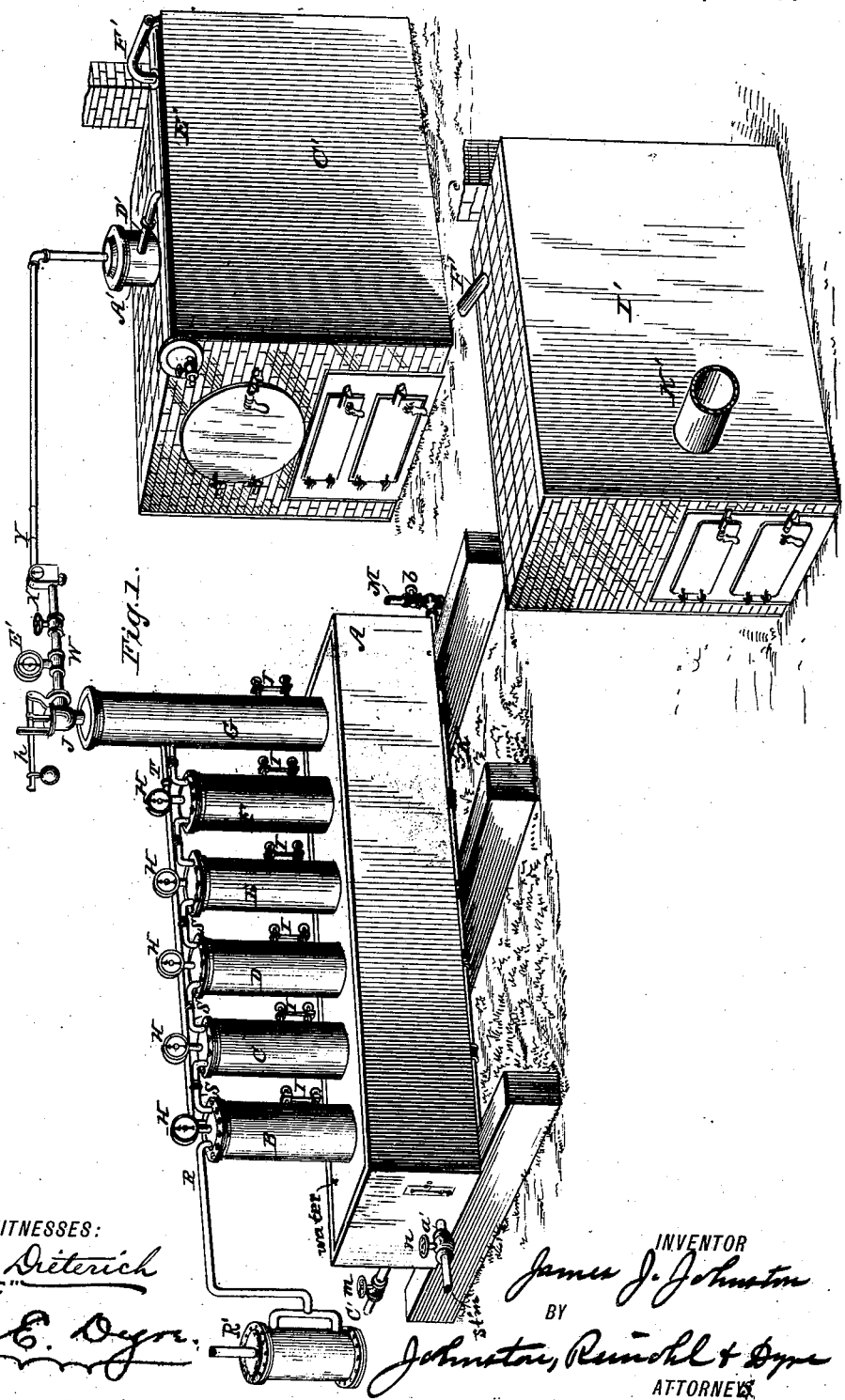

(No Model.) 5 Sheets—Sheet 1.

J. J. JOHNSTON.
PROCESS OF AND APPARATUS FOR MANUFACTURING ILLUMINATING GAS.

No. 356,476. Patented Jan. 25, 1887.

WITNESSES:

INVENTOR

BY

ATTORNEYS (No Model.)  
5 Sheets—Sheet 2.

J. J. JOHNSTON.
PROCESS OF AND APPARATUS FOR MANUFACTURING ILLUMINATING GAS.

No. 356,476.  
Patented Jan. 25, 1887.

WITNESSES:  
Fred. G. Dieterich  
Wm. E. Dyn.

INVENTOR  
James J. Johnston  
BY  
Johnston, Reinohl & Dyn  
ATTORNEYS

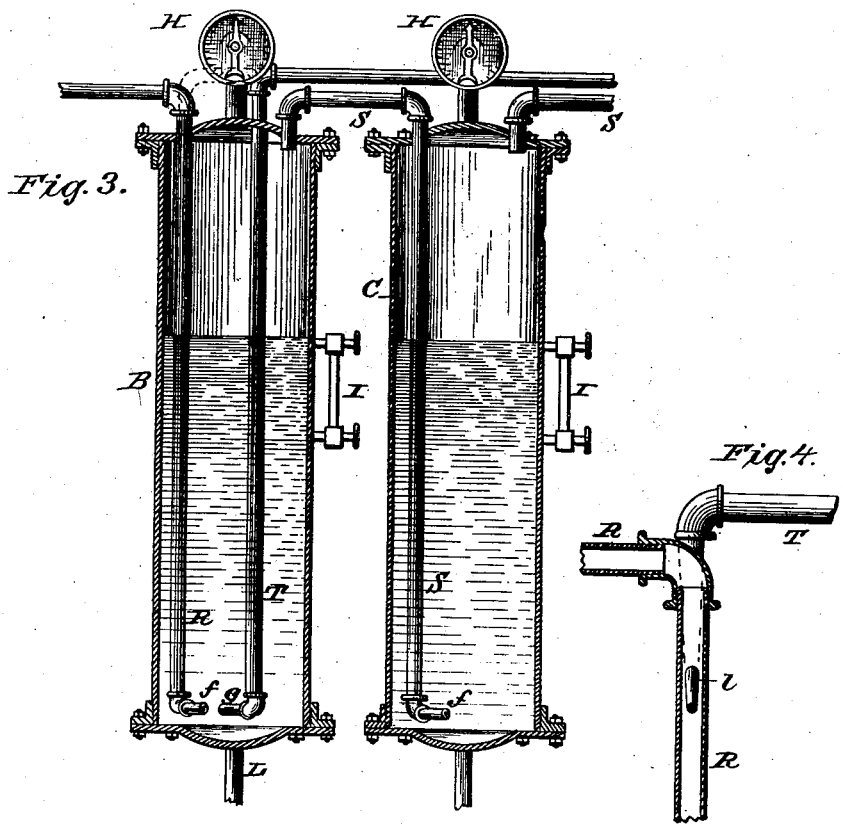

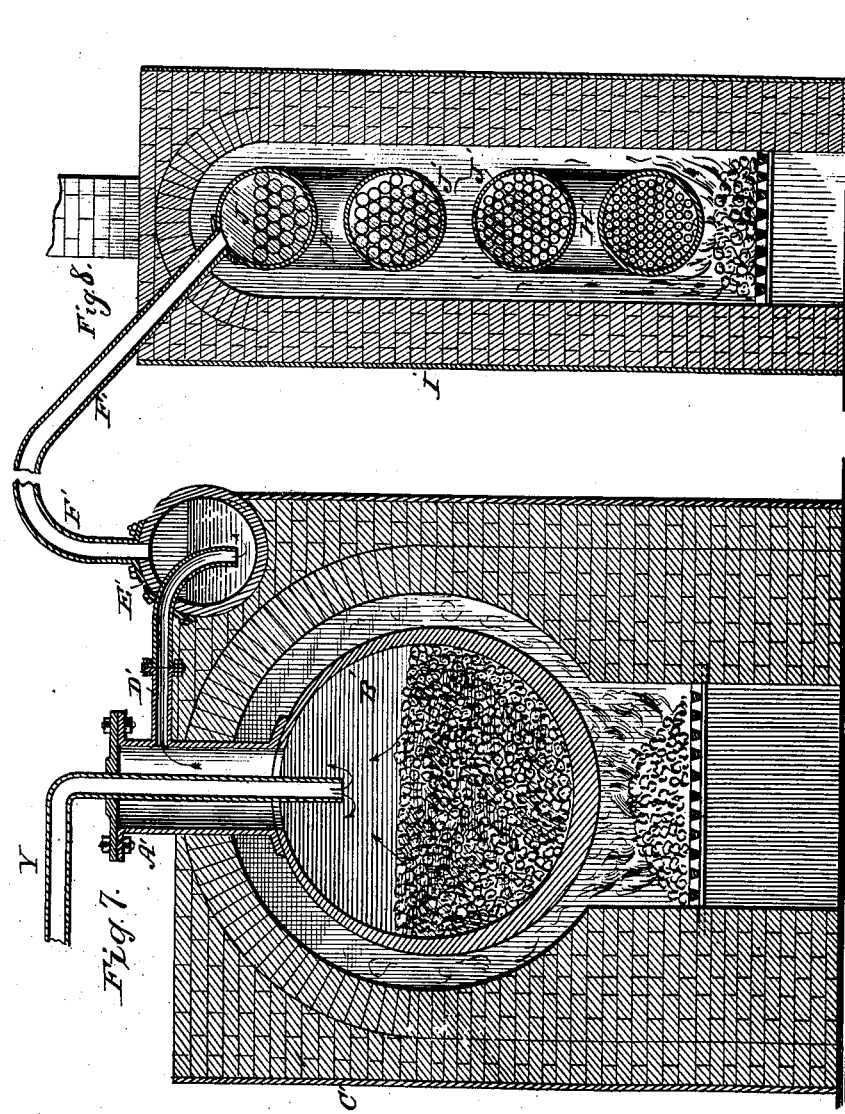

(No Model.) 5 Sheets—Sheet 5.

J. J. JOHNSTON.
PROCESS OF AND APPARATUS FOR MANUFACTURING ILLUMINATING GAS.

No. 356,476. Patented Jan. 25, 1887.

WITNESSES:
Fred G. Dieterich
Wm. C. Dyer.

INVENTOR
James J. Johnston
BY
Johnston, Reinohl & Dyer
ATTORNEYS

UNITED STATES PATENT OFFICE.

JAMES J JOHNSTON, OF COLUMBIANA, OHIO, ASSIGNOR OF ONE HALF TO ALBERT C. ELLIS, OF PITTSBURG, PENNSYLVANIA.

PROCESS OF AND APPARATUS FOR MANUFACTURING ILLUMINATING-GAS.

SPECIFICATION forming part of Letters Patent No. 356,476, dated January 25, 1887.

Application filed February 23, 1886. Serial No. 192,992. (No model.)

*To all whom it may concern:*

Be it known that I, JAMES J. JOHNSTON, a citizen of the United States, residing at Columbiana, in the county of Columbiana and State of Ohio, have invented certain new and useful Improvements in Processes of and Apparatus for Manufacturing Illuminating-Gas; and I do hereby declare the following to be a full, clear, and exact description of the invention, such as will enable others skilled in the art to which it appertains to make and use the same.

The invention relates to the production of a cheap illuminating-gas as a substitute for the gas now in common use.

The state of the art reveals the fact that for the purposes above stated the production of gas has been attended with great trouble, and always with considerable expense, and for the purpose of making such gas various materials have been employed, such as coal, the slacks of coal, oil-bearing shale, petroleum-oil, and the volatile products obtained therefrom, such as benzole and gasoline.

Apparatus of various constructions have been employed in connection with the manufacture of such gas, all of which are more or less costly and, as a rule, complicated in their structure, often requiring a high degree of skill and long experience to operate them.

In the use of petroleum-oil and its volatile products, air, solid carbon, heat, and steam have been employed in various ways and by a variety of means for the purpose of producing a cheap gas. Atmospheric air has been passed through a body of petroleum-oil and its volatile products, and has been caused to pass over the surface of said oil and its products and traverse a series of surfaces arranged in different horizontal and vertical planes. Air has been heated and applied to petroleum-oil and its volatile products in the same manner. Air has also been heated and superheated and applied to said oil and its products. Steam has been applied to petroleum-oil and its products in the same manner as air above described, and air and steam combined have been applied in like manner. Petroleum-oil has also been heated and atmospheric air forced through it. The various gases resulting from such applications of air and steam to petroleum-oil and its products have been employed in the arts for heating and illuminating purposes, and air and steam treated as above described have been combined with solid carbons and subjected to high degrees of heat and employed for the purposes stated. Superheated steam and air have been applied to the surface of petroleum oil contained in a vessel and mingled with the vapors of said oil evolved by said heat and subsequently subjected to a high degree of heat for the purpose of making a fixed gas therefrom, as described by me in my patent, No. 50,935, granted November 14, 1865, and reissued September 9, 1873, No. 5,570, and August 13, 1878, No. 8,373.

In all the various processes referred to, the gases arising from the air, heated air, or steam and petroleum-oil or its volatile products have been condensable unless fixed by subjecting it to a high degree of heat subsequent to the mixing of the gases.

Air and petroleum-oil each have their peculiar properties, and we cannot impart to them other properties than those which they possess; but my object is to so apply the laws that control them as to produce a fixed gas for illuminating purposes. It is a fact well known that atmospheric air consists of oxygen and nitrogen, and petroleum-oil consists of carbon and hydrogen, and that the particles of these elements have each their own atomic weight and combining quantity. It is also well known that these elements and their particles are unlike, and that chemical affinity acts only upon unlike particles. Therefore these elements will combine in their own combining quantities; hence the purpose of my invention is to unite these elements contained in atmospheric air and petroleum-oil by causing atmospheric air and petroleum-oil to act the one upon the other in the manner hereinafter described for the purpose of producing a fixed, cheap, and efficient illuminating-gas.

Figure 2:
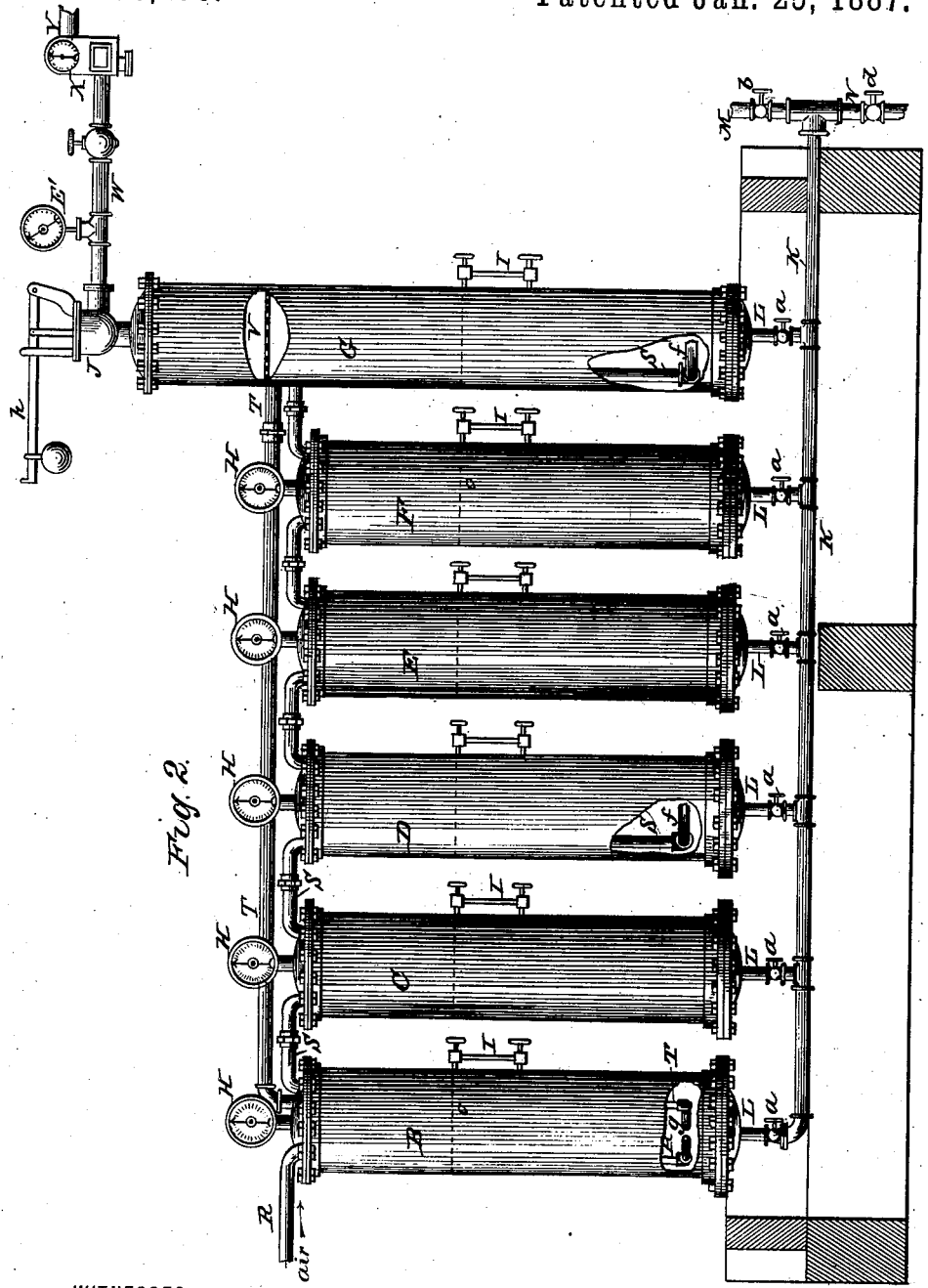
Figure 9:
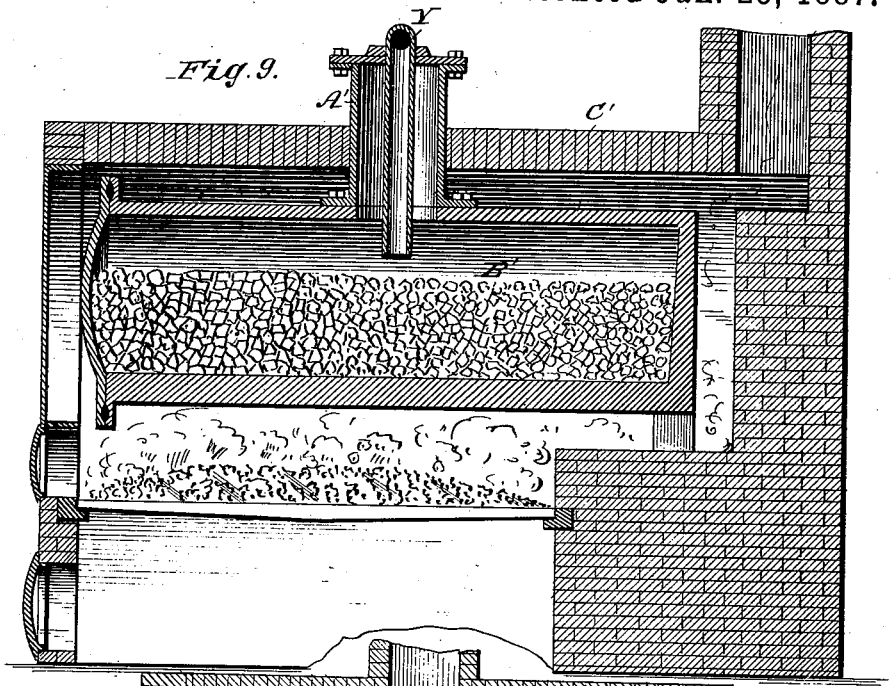
Figure 10:
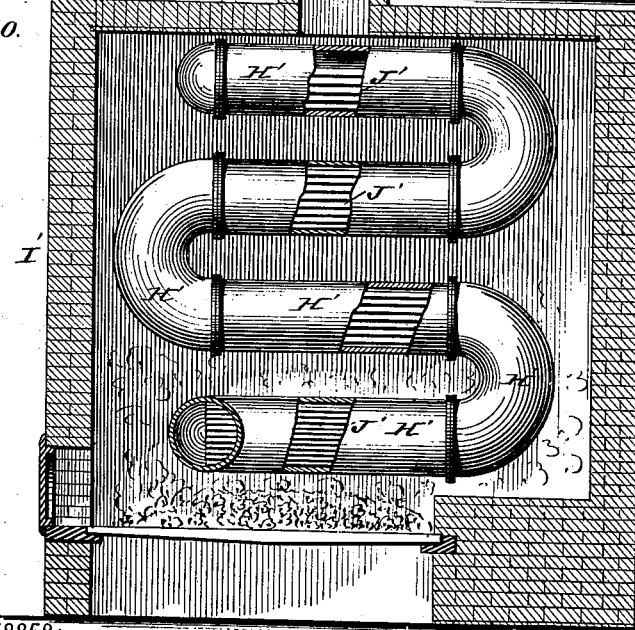

In the accompanying drawings, which form a part of my specification, Figure 1 is a perspective view of the apparatus employed for carrying out my invention. Fig. 2 is a side elevation, partly in section, of a series of vessels and their connections for generating gas. Fig. 3 is a vertical section of two of the vessels. Figs. 4, 5, and 6 are sectional details. Fig. 7 is a vertical transverse section of the coal gas retort and its furnace. Fig. 8 is a vertical transverse section of the gas-fixing furnace. Fig. 9 is a vertical longitudinal section of the coal-gas retort and its furnace. Fig. 10 is a vertical longitudinal section of the gas-fixing furnace.

In order that others skilled in the art to which my invention appertains may understand its construction and operation, I will now proceed to describe the same.

Before describing the apparatus I would state that by heating petroleum-oil to 186° Fahrenheit it evolves benzole, and that the other products of it are evolved by increasing the heat in proportion as its lighter products are carried off and its specific gravity increased. Therefore the operator will be required to be careful not to heat the oil at the beginning of the operation to a temperature exceeding 100° Fahrenheit, and always bear in mind that the temperature of the oil in all cases must be kept much below the evolving-point of benzole until all of its light and volatile products have been carried off and its specific gravity increased to about 40°, at which point the temperature may be gradually increased in proportion as the specific gravity of the oil increases; but in no case should its temperature (after the lighter products have been carried off) exceed 210° Fahrenheit.

In all cases the oil in the vessels should be subjected to pressure, and I have found by practicing my invention that an average pressure of eight (8) pounds to the square inch produces a very desirable result, the quality of the gas increasing with the increase of the pressure upon the surface of the oil in the generators.

I wish it distinctly understood that every precaution should be taken to avoid evolving vapor from the oil or charging the atmospheric air with vapor, as ordinarily practiced in carbureting air for making illuminants.

I will now proceed to describe the apparatus, reference being had to the drawings and the letters of reference marked thereon.

A represents a tank containing water, in which are placed the vessels B, C, D, E, F, and G. Said vessels are provided with pressure-gages H, the vessel G having an adjustable gage or pressure-valve, J. The vessels are also provided with ordinary sight-gages for indicating the height of the oil in said vessels. The lower ends of the vessels communicate with a pipe, K, by means of branches L, provided with valves $a$, which branches extend through the bottom of the water tank A. The water tank is provided with a steam pipe, $a'$, having a valve, $n$, and may traverse the interior of the tank for the purpose of heating the water contained therein, and thereby heating the oil in the vessels to the desired temperature, which heat is indicated by a thermometer, $b'$, in one end of the tank A, and with a water-supply pipe, $c'$, having a valve, $m$. The pipe K communicates with a pipe, M, which communicates with an oil supply, said pipe being provided with a valve, $b$. To pipe K is connected branch pipe N, having valve $d$.

The pipe R communicates with an air-pump, R', which, by preference, is of the class provided with a by-pass valve to circulate the air from one side of the piston to the other when the maximum pressure has been attained in the vessel G. When the pressure in the vessels has been reduced by the opening of the valve J, the pump will again deliver air into the vessel B and continue the circulation thereof through the vessels. The pipe R enters through the top of the vessel B, extends to the bottom of said vessel, and terminates in a curved lateral discharge branch, $f$, as shown in Fig. 5. To the upper end of the vessel B is attached a pipe, S, which passes through the upper end of the vessel C, extends to the bottom thereof, and also terminates in a curved branch of the same construction as $f$ in vessel B. Each of the successive vessels is provided with a similar connection, and need not therefore be further described. The pipes in the several vessels should be provided with back-pressure valves.

To the vessel G is attached a pipe, T, which enters the top of the vessel B, extending down to the bottom thereof and terminating in a curved lateral branch, $g$, projecting in the same direction as the branch $f$. Instead of passing down to the bottom of the vessel, the pipe T may enter the pipe R and terminate in a contracted nozzle, forming an injector, as indicated at $l$ in Fig. 4. The vessel G is provided with a perforated diaphragm, V, arranged above the plane on which the pipe T connects therewith, and to the upper end of said vessel is attached a pressure-valve, J, provided with a weighted lever, $h$. To the valve J is attached a pipe, W, which is provided with a valve, $k$, and a pressure-gage, E', and communicates with a meter, X, to which is attached a pipe, Y, which enters the stand-pipe A' of the retort B', arranged in furnace C', the construction of which is shown in Figs. 7 and 9. The discharge end of the pipe Y extends down into retort B for the purpose of discharging the gas upon and into the body or mass of carbonaceous matter—such as bituminous coal or oil-bearing shale—contained in the retort, and mingling it with the gas evolved therefrom. To the stand-pipe A' is connected a pipe, D', which is connected with the hydraulic main E', is curved downward, and extends nearly to the bottom thereof; and to the hydraulic main E' is attached a pipe, F', which communicates with the upper member, G', of the gas-fixing chamber H', which consists of a large serpentine pipe traversing the fire-chamber of the furnace I'. The construction of the furnace and fixing-chamber is clearly shown in Figs. 8 and 10. In the horizontal members of the fixing-chamber H' are arranged a series of pipes, J', graduated in diameter from the upper to the lower one of said members and extending throughout the length of said members. These pipes afford increased heating-surface to act upon the gas entering the chamber H'.

To the lower member of the fixing-chamber H' is connected a pipe, K', which may be connected with any of the known forms of coolers, scrubbers, and purifiers used in connection with the manufacture of gas, and with an ordinary holder and the mains of a gas-supplying system.

The several parts of the apparatus being constructed substantially as described, the operation is as follows: The several vessels B, C, D, E, F, and G are filled with crude petroleum-oil to about the dotted line o shown in Fig. 2 by opening the valves a in the branches L and b, in the supply-pipe M, and when the oil in the several vessels has reached the point indicated by the line o the valve b is closed, and then the valves a are closed. The oil remaining in pipe K is drawn off through pipe N into a suitable vessel by opening the valve d. The tank A having been filled with water, steam is applied by pipe a', the water in the tank heated, and through it the oil in the several vessels to a temperature not exceeding 100° Fahrenheit. The air-pump is then put into operation, and atmospheric air is forced through pipe R, and is discharged at the bottom of the vessel B through the curved branch f, imparting to the oil in said vessel a circular or whirling motion, and, passing up through the oil in said vessel, enters the space above the oil, where it is separated from the liquid and passes through the pipe S into the vessel C, and is discharged in the bottom thereof, imparting to the oil a whirling or circular motion, as in vessel B, and, rising to the surface of the oil, it is again separated from the liquid, and passes on through each of the remaining vessels successively with the same effect. From the vessel G the air is returned to the bottom of the vessel B through the medium of the pipe T, and discharged through the branch g, accelerating the whirling motion of the oil in said vessel, and, again rising to the surface mingled with the incoming air from the pump, it is further enriched with the hydrocarbon of the oil. The air contained in the vessel B above the line o is now forced by the pressure of the incoming air into the next vessel, and so on throughout the series of vessels, and again returned to the vessel B. This operation is repeated until the pressure in the vessel G above the line o has reached the point fixed upon to open the valve J, by which time the air will have been conducted through the oil so many times that the elements of the air will have united with the carbureted hydrogen given off by the coil, and by the affinity of the particles or atoms of these elements for each other each will have absorbed so much of the other that a union is formed and a fixed gas generated which will not condense under ordinary circumstances in a holder. Any liquid carried by the air from the vessel will be precipitated in its passage through the perforated diaphragm V in the vessel G, and thus prevent the possibility of any liquid being carried over into the retort B'.

By the repeated circulations of the air through the several vessels containing oil, the effect is as follows: Let it be supposed that the maximum pressure is set at thirty (30) pounds, and the maximum height of five of the vessels is six (6) feet and the vessel G eight (8) feet, and a depth of four feet of oil in each vessel. In this case the air would pass through twenty-four (24) feet of oil and have undergone six (6) distinct separations from the oil by the time it reaches the upper part of the vessel G and have generated a fixed gas. By the time the gas has reached its maximum pressure of thirty (30) pounds it will have been circulated through each of the vessels containing the oil not less than thirty (30) times, making in the aggregate a column of not less than seven hundred and twenty (720) feet of oil through which the gas has passed, and been distinctly separated therefrom one hundred and eighty (180) times, when it will pass through the pipes W and Y into the retort B' and mingle with the gas evolved from the carbonaceous matter contained therein, which, previous to the admission of the gas from the pipe Y, has been heated to a temperature not exceeding 700° Fahrenheit and maintained at said point for about two (2) hours.

The gas entering the retort B' from the pipe Y mingles and combines with the gas evolved from the carbonaceous matter and passes off through the pipe D' into the hydraulic main E', and is discharged below the surface of the liquid contained therein. From the hydraulic main the gas is conducted to the fixing-chamber through pipe F', which communicates with the upper member, J', thereof, and is subjected to a temperature not exceeding 1200° Fahrenheit, and then passes on through the cooler and purifier to a gas-holder, and is ready for use.

In practicing my invention I have discovered that the gas generated by uniting air with the hydrocarbon of petroleum-oil under pressure can be greatly improved as an illuminant by enriching it with carbon, and that after having been mingled and combined with the gas evolved from heated carbonaceous matter and subjected to heat in the fixing-chamber it produces an illuminating gas of great brilliancy at a very nominal cost. I have also discovered that the specific gravity of the oil should be at least 55°, and never above 60°, which can be had by mixing benzole (the specific gravity of which is usually 65°) with heavy oil. For example, if the oil is 45° and the benzole 65°, then equal parts are taken and mixed.

It has been demonstrated by working my invention that two (2) barrels of crude petroleum-oil and four (4) tons of bituminous coal treated by my process will yield more than four hundred thousand (400,000) cubic feet of superior illuminating-gas.

In another application filed herewith, Serial No. 192,893, I have claimed the process involved and the apparatus employed for generating gas to the point at which it is conducted into the retort containing carbonaceous matter.

Having thus fully described my invention, what I claim is—

1. The process herein described of generating illuminating-gas, which consists in conducting air under pressure into a vessel containing hydrocarbon oil and discharging it at or near the bottom of the vessel in a direction to impart a whirling or circular current motion to the oil, by which the air follows the current of the oil, is retarded in its ascent to the surface, and a fixed gas formed, then conducting said fixed gas into a retort containing heated carbonaceous matter and mingling it with the gas evolved therefrom, and finally subjecting the combined gases to heat to fix them, as and for the purpose set forth.

2. The process herein described of generating illuminating-gas, which consists in circulating air under pressure through hydrocarbon oil contained in a close vessel or vessels, separating the resulting gas from the oil, returning the gas to the vessel or vessels containing the oil, mingling it with fresh air and again conducting it through the oil to form a fixed gas, then conducting said gas into a retort containing heated carbonaceous matter and mingling it with the gas evolved therefrom, and finally reheating the combined gases to fix them.

3. The process herein described of generating illuminating-gas, which consists in heating hydrocarbon oil to a degree below the evolving-point of its lighter products, conducting air under pressure into a vessel containing said oil and discharging it at or near the bottom of the vessel in a direction to impart a whirling or circular current motion to the oil, by which the air follows the current of the oil in its ascent to the surface and forms a fixed gas, then conducting said gas into a retort containing heated carbonaceous matter and mingling it with the gas evolved therefrom, and finally superheating the combined gases to fix them.

4. The process herein described of generating illuminating-gas, which consists in heating hydrocarbon oil to a degree below the evolving-point of its lighter products, conducting air under pressure through a body of said oil contained in a close vessel, separating the resulting gas from the oil, returning said gas to the vessel containing the oil, mingling it with fresh air, and again conducting it through the oil, forming a fixed gas, then conducting said gas into a retort containing heated carbonaceous matter and mingling it with gas evolved therefrom, and finally reheating the combined gases to fix them.

5. The process herein described of generating illuminating-gas, which consists in conducting atmospheric air under pressure into a vessel containing hydrocarbon oil and discharging it at or near the bottom of the vessel, conducting it up through the oil, separating the resulting gas from the oil in the same vessel, and conducting the gas through one or more successive vessels containing said oil, and separating the gas from the oil in each vessel, then conducting it from the last vessel into a retort containing heated carbonaceous matter and mingling it with the gas evolved therefrom, and finally reheating the combined gases to fix them.

6. The process of generating gas which consists in conducting air under pressure into a vessel containing oil under pressure and discharging it at or near the bottom of the vessel, conducting it up through the oil and separating it therefrom in a space above the oil, conducting it into other vessels containing oil under pressure, then conducting the resulting gas under augmented pressure into a retort containing heated carbonaceous matter and mingling it therewith, and finally reheating the combined gases to fix them, substantially as described.

7. The process of generating gas which consists in maintaining hydrocarbon oil at a temperature below the evolving-point of its lighter products, conducting air under pressure into a series of vessels containing said oil, which is also under pressure, passing the air through the oil and separating it therefrom in each vessel, then conducting the resulting gas under augmented pressure into a retort containing heated carbonaceous matter and mingling it therewith, and finally subjecting the combined gases to heat to fix them, substantially as described.

8. The combination of a series of vessels connected by pipes which extend from the upper part of one to the lower part of another vessel, a retort, and a fixing-chamber, substantially as described.

9. The combination of a series of vessels connected by pipes which extend from the upper part of one to the lower part of another vessel, a pipe connecting the last vessel with one of the preceding vessels, a retort, and a fixing-chamber, substantially as described.

10. A series of vessels, a pipe leading to or near the bottom of the first vessel, and a pipe connecting with the upper part of said vessel and extending into and near the bottom of the next vessel, in combination with a retort and a superheating-chamber, substantially as described.

11. The combination of a series of vessels connected by pipes which communicate with the upper part of one vessel and discharge into the next vessel near the bottom thereof, a diaphragm in the last vessel, a pressure-regulating valve, a retort, and a superheating-chamber, substantially as described.

In testimony whereof I affix my signature in presence of two witnesses.

JAMES J. JOHNSTON.

Witnesses:
S. A. PERRY,
WM. E. DYRE.